Patented Mar. 23, 1954

2,673,214

UNITED STATES PATENT OFFICE 2,673,214

POLYHYDROXYAMINO ACID COMPOUNDS

Frederick C. Bersworth, Framingham Center, and Albert E. Frost, Marlborough, Mass.; said Frost assignor to said Bersworth No Drawing. Application June 11, 1952, Serial No. 292,996

6 Claims. (Cl. 260—500)

This invention relates to a new and useful class of polyhydroxyamino acid compounds which are sequestering agents for metal ions, including iron, in strongly acid to strongly alkaline solution.

It is, therefore, an object of this invention to prepare polyhydroxyamino acids which are capable of holding metal ions, particularly ferric ions, in solution over a wide pH range.

Another object of this invention is to provide compounds useful as intermediates in the production of soap-like products.

These and other objects of this invention are accomplished by the following invention which comprises polyhydroxyamino acids of the general formula:

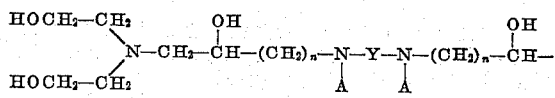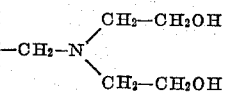

wherein Y is a bivalent alkylene radical of two to three carbon atoms which may be unsubstituted or may bear one or more alkyl groups of one to two carbon atoms; $n$ is a positive integer and is selected from the group consisting of 1, 2, 3 and 4; A is a member of the group consisting of —$CH_2COOH$, —$CH_2CH_2COOH$, —$CH_2PO_3H$, —$CH_2CH_2PO_3H$, —$CH_2CH_2SO_3H$ and their alkali metal salts.

The compounds of this invention may be prepared by any of several known methods. One of these methods which is applicable to the synthesis of all the compounds of this invention comprises reacting two molecular proportions of a suitable ω-halogen substituted C-alkyl substituted triethanolamine, such as C-(2-chloromethyl)-triethanolamine, with one molecular proportion of the appropriate alkylene diamine bearing the desired substituents A and Y under conditions so as to obtain a maximum yield of the desired product.

A second method of preparation consists in reacting an appropriate ω-amino-C-alkyl-substituted triethanolamine derivative, for example, C-(2-amino-methyl)-triethanolamine, with the proper alkylene dihalide, such as, N,N'-di-(2-chloro-ethyl)-ethylene-diamine diacetic acid in a two to one molar ratio.

The preparation of the polyhydroxyamino acids of this invention by the action of a halogen alkyl acid, such as chloropropionic acid, on a suitable polyhydroxyl polyamine, such as, N,N'-di-(2-hydroxy-3-iminodiethanol-propyl)-ethylene diamine, is not a satisfactory method because of the formation of ether type acids along with the desired polyhydroxyamino acids.

The compounds of this invention wherein A represents —$CH_2COOH$ and its alkali metal salts are best prepared by the process set forth by Bersworth in U. S. Patent 2,407,645, issued September 17, 1946. This method, briefly, consists in adding two mols of formaldehyde and two mols of sodium cyanide slowly and in small balanced quantities under strongly alkaline conditions to the proper polyhydroxyl polyamine, such as N,N'-di-(2-hydroxy-3-iminodiethanol propyl)-isopropylene diamine, and heating and agitating the mixture.

Although the compounds of this invention can be prepared by methods other than those described above and also by modifications which will appear to those skilled in the art, we prefer to use the procedures followed in the specific examples since they are easily carried out, require no complicated apparatus and involve a minimum of manipulation.

As will be seen, therefore, the new compounds are made from the following starting materials, namely, symmetrical alkylene diamino acids and their salts A—NH—Y—NH—A, ω-halogen substituted - C - alkyl-substituted triethanolamines, ($HOCH_2$—$CH_2$)$_2$—N—$CH_2$—
$\qquad$ CHOH—($CH_2$)$_n$Cl (or Br)

and N,N'-di-(hydroxy-ω-iminodiethanol-alkyl)-alkylene diamines, ($HOCH_2$—$CH_2$)$_2$N—$CH_2$—CHOH—
$\qquad$ ($CH_2$)$_n$—NH—Y—NH—($CH_2$)$_n$—
$\qquad$ CHOH—$CH_2$—N($CH_2$—$CH_2OH$)$_2$ As symmetrical alkylene diamino acids suitable for use in making the new compounds there may be mentioned: ethylene diamine-N,N'-diacetic acid, ethylene diamine-N,N'-dipropionic acid, isopropylene diamine-N,N'-diacetic acid, isopropylene diamine-N,N'-dipropionic acid, trimethylene diamine-N,N'-diacetic acid, trimethylene diamine-N,N'-dipropionic acid, ethylene diamine-N,N'-dimethyl phosphonic acid, isopropylene diamine-N,N'-dimethyl-phosphonic acid, trimethylene diamine-N,N'-dimethyl phosphonic acid, ethylene diamine-N,N'-diethyl phosphonic acid, isopropylene diamine-N,N'-diethyl phosphonic acid, trimethylene diamine-N,N'-diethyl phosphonic acid, ethylene diamine-N,N'-diethyl sulfonic acid, isopropylene diamine-N,N'-diethyl sulfonic acid, trimethylene diamine-N,N'-diethyl sulfonic acid and their alkali metal salts.

The following ω-halogen-substituted-C-alkyl-substituted triethanolamines may be mentioned as suitable starting materials, namely, C-(2-chloromethyl) - triethanolamine, C-(2-chloroethyl)-triethanolamine, C-(2-chloropropyl)-triethanolamine, C-(2-chlorobutyl) - triethanolamine, C-(2-bromomethyl)-triethanolamine and C-(2-bromopropyl)-triethanolamine.

As suitable N,N'-di-(hydroxy-ω-iminodiethanol-alkyl)-alkylene diamines there may be mentioned, for example, N,N'-di-(2-hydroxy-3-iminodiethanol-propyl)-ethylene diamine, N,N'-di-(2-hydroxy-3-iminodiethanol-propyl)-isopropylene diamine, N,N'-di-(2-hydroxy-3-iminodiethanol-propyl)-trimethylene diamine, N,N'-di-(3-hydroxy-4-iminodiethanol-butyl)ethylene diamine, N,N'-di-(4-hydroxy-5-iminodiethanol-pentyl)-ethylene diamine, N,N'-di-(5-hydroxy-6-iminodiethanol-hexyl)-isopropylene diamine and N,N'-di-(3-hydroxy-4-iminodiethanol-butyl)-trimethylene diamine.

In addition to the symmetrical alkylene diamino acids mentioned above, 1,2-diamino-cyclohexane-N,N'-dialkyl carboxylic, phosphonic and sulfonic acids and their alkali metal salts may be used.

A preferred compound of this series is produced from 1,2-diaminocyclohexane-N,N'-diacetic acid and C-(2-chloromethyl)-triethanolamine and is represented by the following formula:

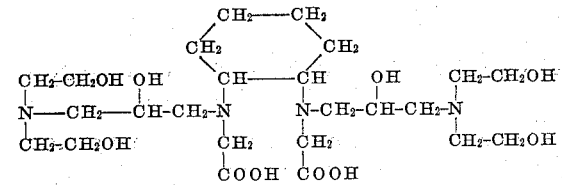

The above starting materials are mentioned only for purposes of illustration and not for limitation of the invention. Obviously other members of the classes indicated by the definitions previously given for the terms n, Y and A can be used in the same way.

The following examples are given by way of illustration only and not in limitation of the invention since the number of compounds which can be made by combining the various starting materials is very large.

EXAMPLE I 0.2 mol (70.9 g.) of N,N'-di-(2-hydroxy-3-iminodiethanol-propyl)-ethylene diamine was treated with sodium cyanide and formaldehyde according to the process set forth by Bersworth in U. S. Patent No. 2,407,645, issued September 17, 1946. The resulting yellow-orange solution sequestered metal ions, including iron, in strongly acid to strongly alkaline solution. Evaporation of the solution to dryness under reduced pressure gave a semi-crystalline yellow liquid which is the disodium salt of N,N'-di-(2-hydroxy-3-iminodiethanol-propyl)-ethylene diamine N,N'-diacetic acid having the following formula:

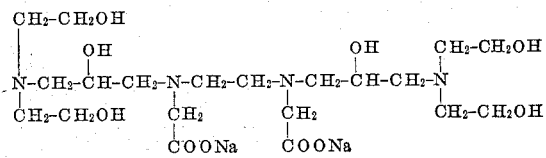

EXAMPLE II 0.2 mol (73.7 g.) of N,N'-di-(2-hydroxy-3-iminodiethanol-propyl) - isopropylene diamine was treated with sodium cyanide and formaldehyde according to the process set forth by Bersworth in U. S. Patent No. 2,407,645 issued September 17, 1946. The resulting yellow-orange solution sequestered metal ions, including iron, in strongly acid to strongly alkaline solution. Evaporation of the solution to dryness under reduced pressure gave a semi-crystalline yellow liquid which is the disodium salt of N,N'-di-(2-hydroxy-3-iminodiethanol-propyl) - isopropylene diamine-N,N'-diacetic acid having the formula:

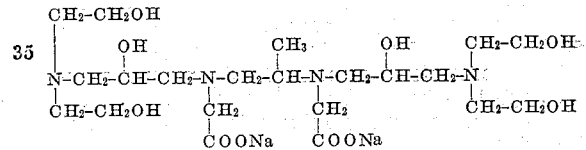

EXAMPLE III

To 0.1 mol (26.2 g.) of the disodium salt of N,N'-trimethylene diamine dipropionic acid in 100 ml. of water heated to gentle reflux, there was added dropwise over a two hour period, 0.2 mol (45.2 g.) of C-(2-chloropropyl)-triethanolamine in 150 ml. of water. The reaction mixture was then heated for an additional four hours after which it was evaporated to dryness under reduced pressure and the dry residue extracted repeatedly with boiling methanol. Evaporation of the methanol solution to dryness gave an extremely viscid yellow liquid which is N,N'-di-(4-hydroxy-5-iminodiethanol-pentyl) - trimethylene diamine-N,N'-dipropionic acid having the formula:

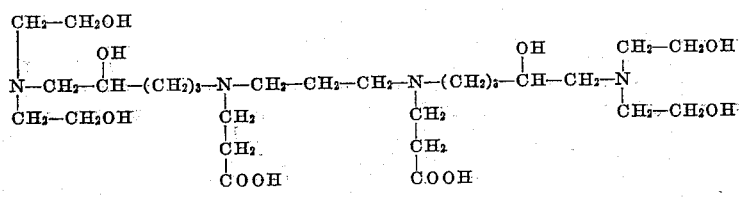

EXAMPLE IV

To 0.1 mol (27.4 g.) of ethylene diamine-N,N'-diethyl phosphonic acid in 200 ml. of water containing 0.2 mol (8.0 g.) of sodium hydroxide and heated to reflux, there was added over a two hour period, a solution of 0.2 mol (79.1 g.) of C-(2-chloromethyl)-triethanolamine in 250 ml. of water. After refluxing for an additional four hours, the mixture was worked up as in Example III to give a viscid yellow liquid which is N,N'- di-(2-hydroxy-3-iminodiethanol-propyl)-ethylene diamine-N,N'-diethyl phosphonic acid having the formula:

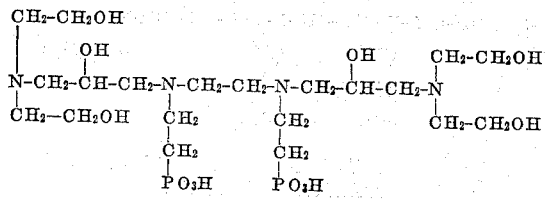

Its aqueous solutions sequester metal ions including iron in strongly acid to strongly alkaline solution.

EXAMPLE V 0.2 mol (79.1 g.) of C-(2-chloromethyl)-triethanolamine in 200 ml. of water was added dropwise with good stirring and over a two hour period to a slowly refluxing solution of 0.1 mol (27.6 g.) of ethylene diamine-N,N'-diethyl sulfonic acid in 15 ml. of water containing 0.2 mol (8.0 g.) of sodium hydroxide. After four hours of refluxing, the mixture was worked up as in Example III to give a pale yellow semi-crystalline product which is N,N'-di-(2-hydroxy-3-iminodiethanol-propyl)-ethylene diamine-N,N'-diethyl sulfonic acid having the formula:

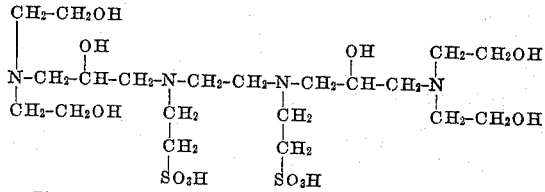

Its aqueous solutions sequester metal ions over a wide pH range.

It is quite likely that these products which are reported as viscid oils or semi-crystalline liquids may eventually become crystalline. The physical state of these products is, therefore, not to be taken as definitely established and the claims are not limited to substances with the exact properties reported.

The products of this invention possess useful and interesting properties as sequestering agents for metal ions, and especially for iron, in strongly acid to strongly alkaline solutions and even dissolve ferric hydroxide in strongly alkaline solutions at room temperature.

They, therefore, have application in the textile and leather industries, in cosmetic and soap compositions, in washing compounds, soaker alkali, glass and metal cleaning preparations, in electroplating, as antioxidants, additives to lubricants and in numerous other applications for which sequestering agents are commonly employed.

The compounds of this invention need not be isolated from their aqueous reaction mixtures but can be used as such in most applications. The aqueous solutions of these products vary from a yellow to an orange color. The products may be isolated from their aqueous solutions by evaporation of the neutralized solutions to dryness followed by alcoholic extraction of the dry residue and evaporation of the alcoholic solution. The products vary from yellow viscid oils to yellow semi-crystalline liquids.

The insolubility of ferric hydroxide and some basic salts of the ferric ion is well known. Aqueous solutions of ferrous compounds are rapidly oxidized to insoluble ferric compounds in acid solutions and, particularly in alkaline solutions. Triethanolamine and certain sugars can sequester iron in alkaline solutions. However, they all suffer the disadvantage of being applicable only in alkaline medium; the sugars suffer the further disadvantage of decomposition in alkali, particularly on warming. The polyhydroxyamino acids of this invention are stable in acid and in alkaline solution and possess a high solvent action on ferric hydroxide even in strongly alkaline medium.

The compounds of this invention possess the ability to hold a very high concentration of metal ions in solution because of the high proportion of chelating centers in the molecule. For example, the two triethanolamine groups in the molecule present two quadridentate groups for chelation and the two amino acid groups present two bidentate groups for chelation. As a result, complex compounds of the type illustrated below may form:

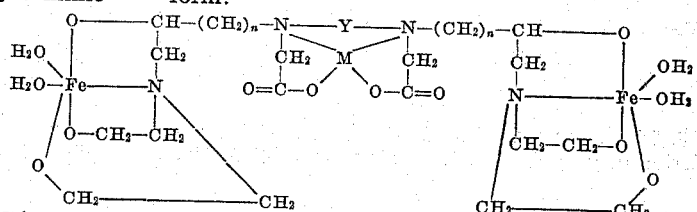

wherein the terms $n$, and Y have the same significance as above.

Having hereinabove disclosed the present invention generically and specifically and having given a plurality of specific embodiments of the same, it is believed apparent that the invention may be widely modified without essential departure therefrom and all such modifications and departures are contemplated as may fall within the scope of the following claims.

What we claim is:

1. Chemical compounds corresponding to the formula:

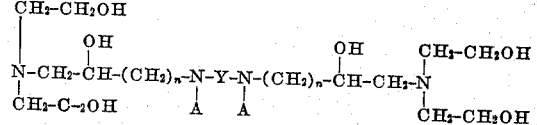

wherein Y is a bivalent alkylene radical of two to three carbon atoms selected from the group consisting of unsubstituted and substituted alkylene radicals carrying at least one alkyl group of from 1 to 2 carbon atoms; $n$ is a positive integer and is selected from the group consisting of 1, 2, 3 and 4 and A is a member of the group consisting of —CH$_2$COOH, —CH$_2$CH$_2$COOH, —CH$_2$PO$_3$H, —CH$_2$CH$_2$PO$_3$H, —CH$_2$CH$_2$SO$_3$H and their alkali metal salts.

2. The compound N,N'-di-(2-hydroxy-3-iminodiethanol propyl)-ethylene diamine-N,N'-diacetic acid conforming to the formula:

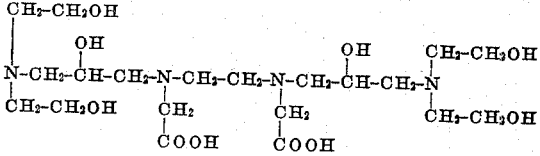

3. The compound N,N'-di-(2-hydroxy-3-iminodiethanol propyl)-isopropylene diamine-N,N'-diacetic acid conforming to the formula:

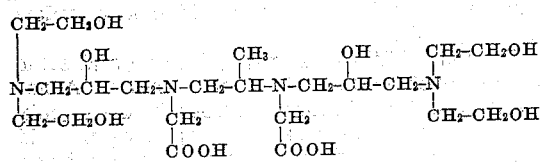

4. The compound N,N'-di-(4-hydroxy-5-iminodiethanol-pentyl)-trimethylene diamine-N,N'-dipropionic acid conforming to the formula:

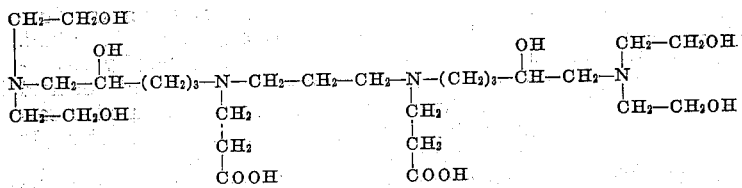

5. The compound N,N'-di-(2-hydroxy-3-iminodiethanol-propyl)-ethylene diamine-N,N'-diethyl-phosphonic acid conforming to the formula:

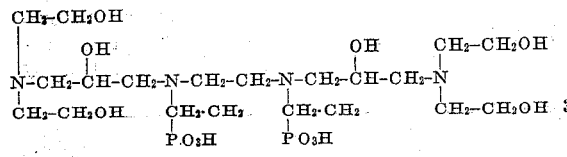

6. The compound N,N'-di-(2-hydroxy-3-iminodiethanol-propyl)-ethylene diamine-N,N'-diethyl sulfonic acid conforming to the formula:

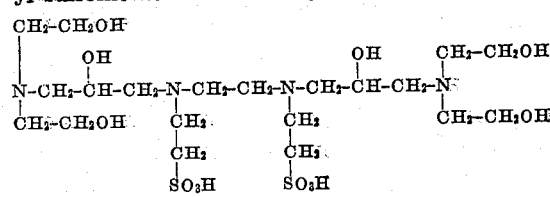

FREDERICK C. BERSWORTH.
ALBERT E. FROST.

References Cited in the file of this patent

UNITED STATES PATENTS

| Number | Name | Date |
| --- | --- | --- |
| 2,176,441 | Ulrich et al. | Oct. 17, 1939 |
| 2,316,606 | Loder et al. | Apr. 13, 1943 |
| 2,316,636 | Teeters | Apr. 13, 1943 |
| 2,407,645 | Bersworth | Sept. 17, 1946 |
| 2,413,856 | Bersworth | Jan. 7, 1947 |
| 1,428,353 | Bersworth | Oct. 7, 1947 |
| 2,532,391 | Bersworth | Dec. 5, 1950 |
| 2,609,390 | Bersworth | Sept. 2, 1952 |

FOREIGN PATENTS

| Number | Country | Date |
| --- | --- | --- |
| 656,427 | Germany | Feb. 5, 1938 |